United States Patent
Katsumaru et al.

(10) Patent No.: US 6,790,331 B2
(45) Date of Patent: Sep. 14, 2004

(54) ELECTRODEPOSITION COATING FILM THICKNESS CALCULATING METHOD, RECORDING MEDIUM STORED WITH FILM THICKNESS CALCULATING PROGRAM AND READABLE BY MEANS OF COMPUTER, AND ELECTRODEPOSITION COATING FILM THICKNESS SIMULATION APPARATUS

(75) Inventors: Shinji Katsumaru, Tokyo (JP); Kiyotaka Yagesawa, Tokyo (JP); Takashi Wada, Tokyo (JP); Katsuhiko Ohara, Hirakata (JP)

(73) Assignee: C. Uyemura & Co., Ltd., Osaka (JP)

( * ) Notice: Subject to any disclaimer, the term of this patent is extended or adjusted under 35 U.S.C. 154(b) by 98 days.

(21) Appl. No.: 10/132,307

(22) Filed: Apr. 26, 2002

(65) Prior Publication Data

US 2003/0042135 A1 Mar. 6, 2003

(30) Foreign Application Priority Data

Apr. 26, 2001 (JP) ........................................ 2001-129528

(51) Int. Cl.[7] .............................................. C25D 21/12
(52) U.S. Cl. ............................. 205/84; 205/81; 205/82
(58) Field of Search ............................... 205/84, 81, 82

(56) References Cited

U.S. PATENT DOCUMENTS 4,287,043 A     9/1981   Eckert et al.
5,080,769 A  *  1/1992   Fassett et al. ................ 204/457
6,542,784 B1 *  4/2003   Amaya et al. ............... 700/121
2002/0139678 A1 * 10/2002 Wilson et al. ................. 205/96

FOREIGN PATENT DOCUMENTS

EP       0 709 495       5/1996
FR       2 524 496      10/1983

OTHER PUBLICATIONS

Allan H. Reed, *Proceedings AESF SUR/FIN® '99, Annual International Technical Conference*, 137–141, Jun. 1999.

González–Cuenca et al. *AIChE Journal (46)*:3:626–631, Mar. 2000.

* cited by examiner

*Primary Examiner*—Wesley A. Nicolas
(74) *Attorney, Agent, or Firm*—Leydig, Voit & Mayer, Ltd.

(57) ABSTRACT

A finite element model of the environment of electrodeposit coating is prepared by a simulation method, change of an electric field in an electrolytic cell for the case of electrodeposit coating is simulated, the distribution of currents then flowing through individual parts of a finite element model of a to-be-coated object is obtained, the electric variables of currents flowing through the respective surfaces of the finite elements of the to-be-coated object are obtained and accumulated according to the current distribution, the thickness of an electrodeposition coating film is calculated as $h=\Sigma K_F I_C C.E.\Delta t/\rho$ if the cumulative electric variable is higher than a deposition starting electric variable such that a fixed concentration is attained by $OH^-$ or $H^+$.

7 Claims, 8 Drawing Sheets

ELECTRODEPOSITION COATING FILM THICKNESS CALCULATING METHOD, RECORDING MEDIUM STORED WITH FILM THICKNESS CALCULATING PROGRAM AND READABLE BY MEANS OF COMPUTER, AND ELECTRODEPOSITION COATING FILM THICKNESS SIMULATION APPARATUS

CROSS-REFERENCE TO RELATED APPLICATIONS

This application is based upon and claims the benefit of priority from the prior Japanese Patent Application No. 2001-129528, filed Apr. 26, 2001, the entire contents of which are incorporated herein by reference.

BACKGROUND OF THE INVENTION

1. Field of the Invention

The present invention relates to an electrodeposition coating film thickness calculating method for calculating the thickness of an electrodeposition coating film, a recording medium stored with an electrodeposition coating film thickness calculating program and readable by means of a computer, and an electrodeposition coating film thickness simulation apparatus.

2. Description of the Related Art

Electrodeposition coating is carried out in a manner such that a to-be-coated object such as the body of an automobile, an anode, and a cathode are located in an electrolytic cell that is filled with an electrodeposition coating fluid, and a film is formed on the surface of the to-be-coated object by electrophoresis. In this electrodeposition coating, the film is first formed on the surface of an outside plate portion of the to-be-coated object that is subject to high voltage. The electrodeposition coating enjoys good throwing power such that paint particles gradually adhere to the inner part of the to-be-coated object that bears no film as the film resistance of the outside plate portion increases.

Owing to its high rustproof properties as well as the good throwing power, the electrodeposition coating is used as prime-coating for the underside of the body of an automobile.

Current easily flows through the outside of the to-be-coated object in a liquid and does not through the inside. A film cannot be easily formed inside a pouchy structure of the car body. It is hard, in particular, to form a film inside a frame member of the car body, such as a side frame portion that is expected to store a reinforcing material for safety, as well as the pouchy structure.

Thus, film formation requires thickness control.

In a conventional film control system, an actual production line is used to apply electrodeposition coating to an actually manufactured car body, in order to confirm satisfactory film formation. Thereafter, various parts of the car body are cut, and the thickness of a film on each inside part is measured to be checked for adequacy.

Using the actual car body, however, this thickness control is troublesome. If the throwing power of the film is insufficient, moreover, the film thickness measurement using the actual car body is expected to be repeated again after the throwing power is improved, so that substantial cost and time are required inevitably.

BRIEF SUMMARY OF THE INVENTION

The object of the present invention is to provide an electrodeposition coating film thickness calculating method capable of calculating the respective thicknesses of films electrodeposited on various parts of a to-be-coated object with high accuracy by using data on an analytic model that replaces the to-be-coated object without using the actual to-be-coated object, a recording medium stored with an electrodeposition coating film thickness calculating program and readable by means of a computer, and an electrodeposition coating film thickness simulation apparatus.

In an aspect of the present invention, a thickness $\underline{h}$ of a film electrodeposited on the surface of the to-be-coated object is calculated according to $h=\Sigma K_F I_C C.E.\Delta t/\rho$ ($K_F$ is an electrodeposit coating equivalent, $I_C$ is a film deposition current density, C.E. is a current efficiency, $\Delta t$ is a time interval, and $\rho$ is a film density).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to the accompanying drawings.

Figure 1:
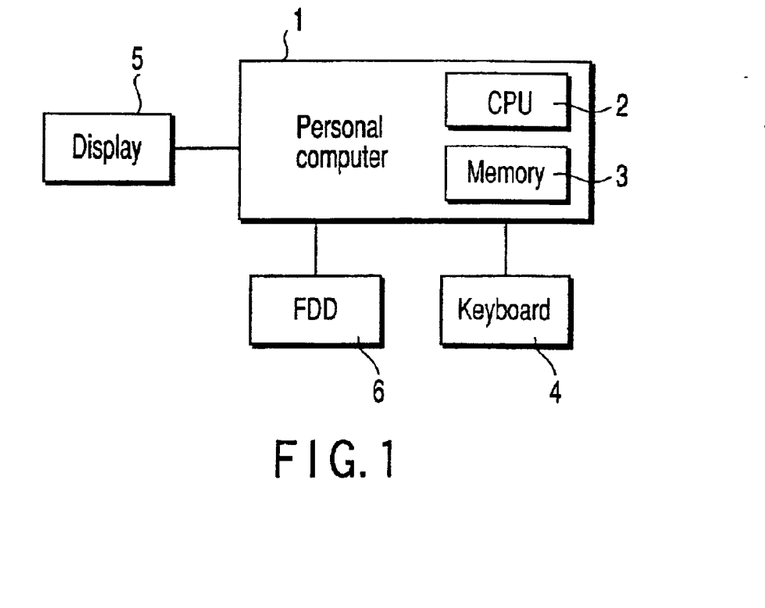
FIG. 1 is a block diagram showing a system for carrying out an electrodeposition coating film thickness calculating method according to an embodiment of the invention.

FIG. 1 shows a system used to calculate the thickness of an electrodeposition coating film. In FIG. 1, numeral 1 denotes a personal computer (hereinafter referred to as PC). The body of the PC 1 is mounted with a CPU 2 and a memory 3. Further, the PC 1 is connected with a keyboard 4, display unit 5, and FDD (floppy disc drive) 6.

The memory 3 is stored with a finite element method program that is needed in preparing a meshed finite element model, for example. Based on this finite element method program, a finite element model is prepared that replaces an electrolytic cell 7 filled with an electrodeposition coating fluid used in an actual electrodeposition coating process, for example, shown in FIG. 4, an anode 8 and a cathode 9 that are located in the fluid in the electrolytic cell 7, and a to-be-coated object, such as a front side member portion 10 (e.g., a portion in the form of a flat bottomed tube having small holes 10a in a part of its peripheral wall) of the body of an automobile, located in the fluid so as to conduct to the cathode 9.

The memory 3 is stored with:

(a) a program for simulating time-based change of potential in the electrolytic cell 7 of the finite element model made when current is supplied between the anode 8 and the cathode 9 of the finite element model;

(b) a program for obtaining the distribution of currents that flow through the respective surfaces of various parts of the finite element model of the side member portion 10 according time-based potential;

(c) a cumulative program for obtaining electric variables that flow through the surfaces of the element for the individual elements thereof, according to the current distribution, and integrating (accumulating) the electric variables only when the density of the current that flows through the side member portion 10 exceeds a current density $I_d$ are consumed diffusively;

(d) a function for determining whether or not the cumulative electric variable Q is higher than an electric variable deposition starting electric variable $Q_0$ that involves predetermined deposition of an electrodeposit coating material with OH⁻ ions or H⁺ ions at a concentration;

(e) a function for calculating a thickness h̲ of a film electrodeposited on the surface of the side member portion 10 according to $h = \Sigma K_F I_C \text{C.E.} \Delta t/\rho$ tm ... (1)

based on experimentally set parameters $K_F$, C.E., $\Delta t$, $\rho$ that are inputted by means of the keyboard 4 or the like if the cumulative electric variable Q is higher than the deposition starting electric variable $Q_0$;

(f) a function for calculating the thickness of the film electrodeposited on the surface of the side member portion 10 according to $h = \Sigma K_F I_C \text{C.E.} \alpha \Delta t/\rho$ tm ... (2)

if the cumulative electric variable Q is not higher than the deposition starting electric variable $Q_0$, where $\alpha$ is an initial deposition coefficient, $K_F$ is an electrodeposition coating equivalent, $I_C$ is a film deposition current density, C.E. is a current efficiency, $\Delta t$ is a time interval, and $\rho$ is a film density; and (g) a function for displaying the calculated film thickness for each element of the side member portion 10, e.g., for color-coding and displaying each film thickness, till the passage of conduction time for electrodeposit coating.

Figure 2:
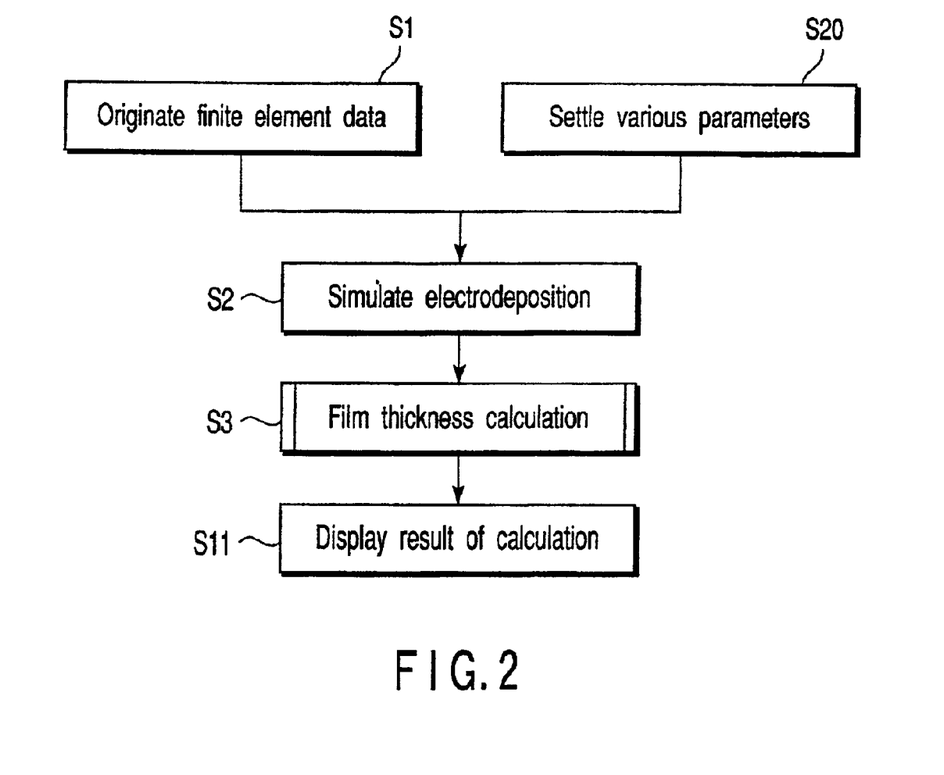
FIG. 2 is a flowchart for illustrating the film thickness calculating method.
Figure 3:
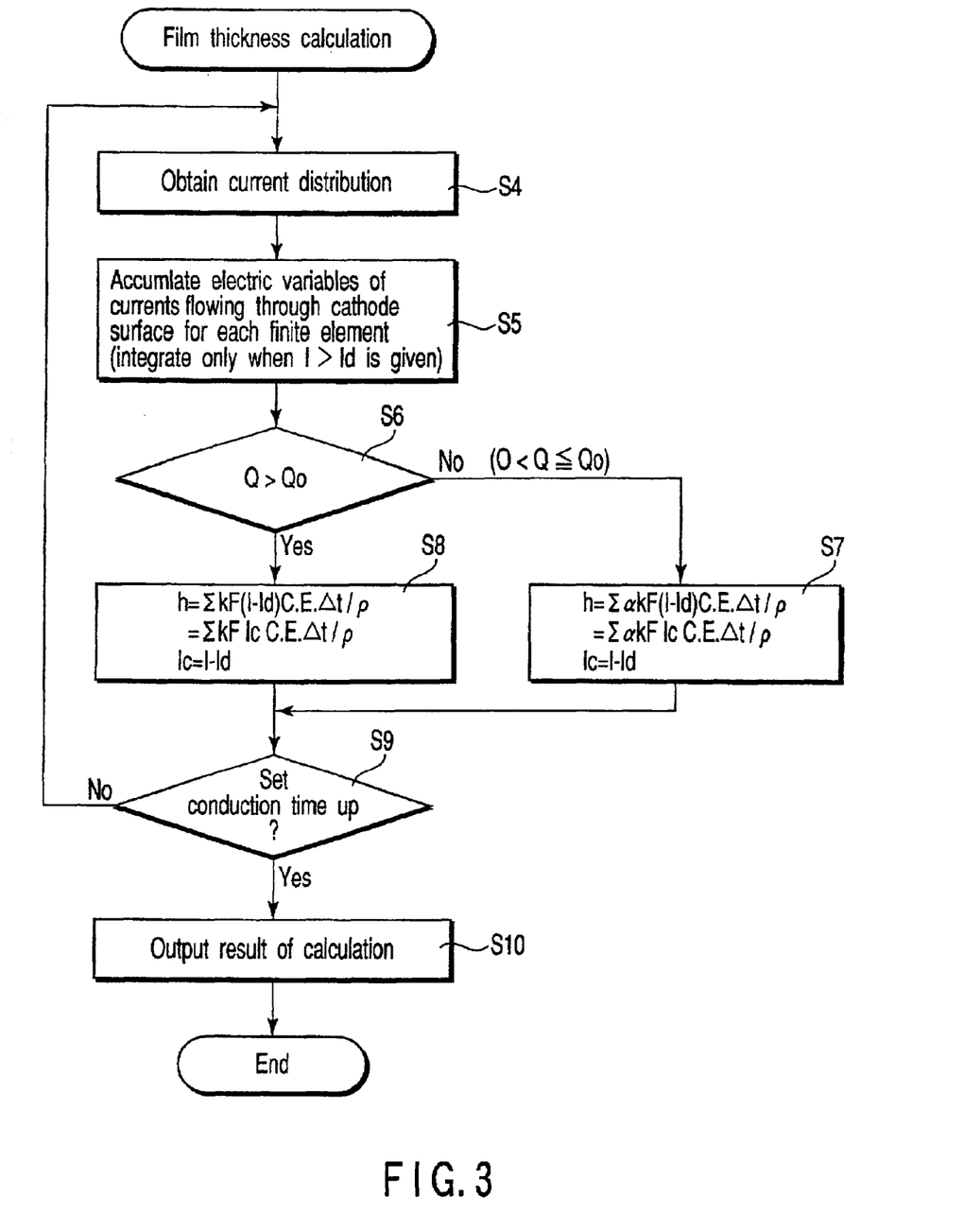
FIG. 3 is a flowchart for illustrating the details of the film thickness calculating method.

The flowcharts of FIGS. 2 and 3 show processes for the film thickness calculation made by means of the functions described above.

An electrodeposition coating film thickness calculating method will now be described with reference to these flowcharts.

First, an analytic model of the environment of electrodeposition coating for the side member portion 10 (to-be-coated object) in Step S1.

Figure 4:
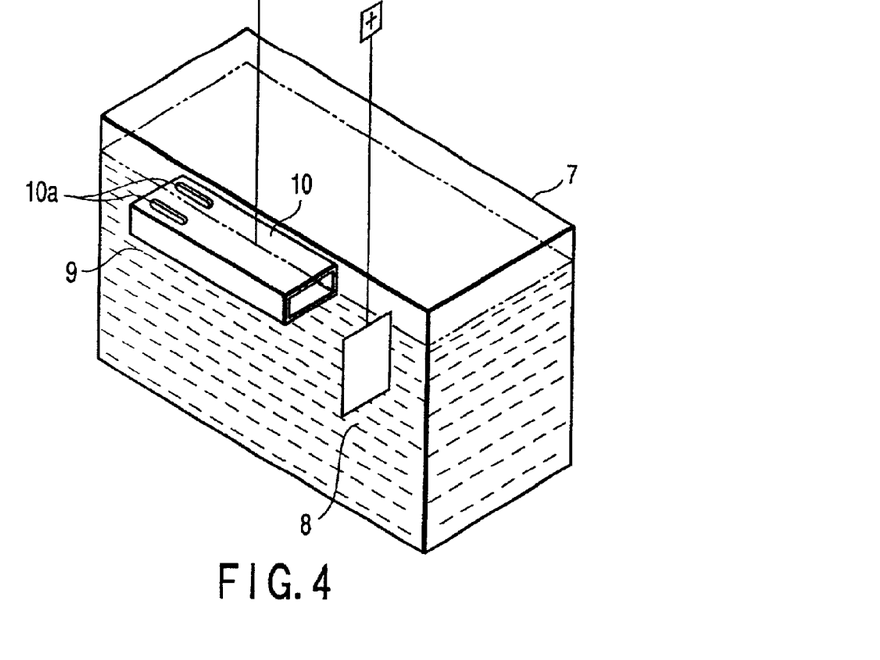
FIG. 4 is a perspective view showing the environment of electrodeposition coating.
Figure 5:
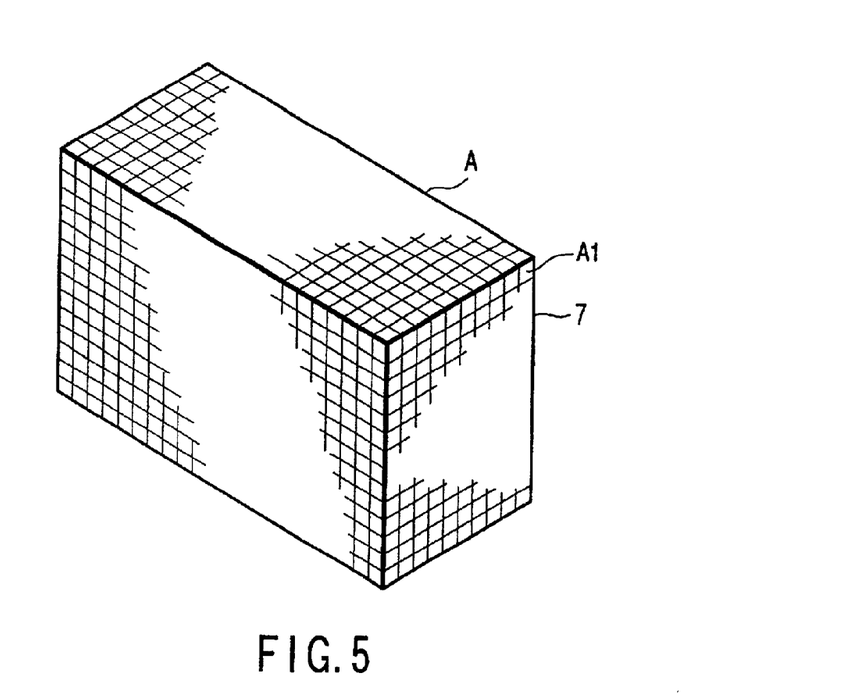
FIG. 5 is a perspective view showing an analytic model obtained by meshing an electrolytic cell used for the electrodeposition coating by the finite element method.
Figure 6:
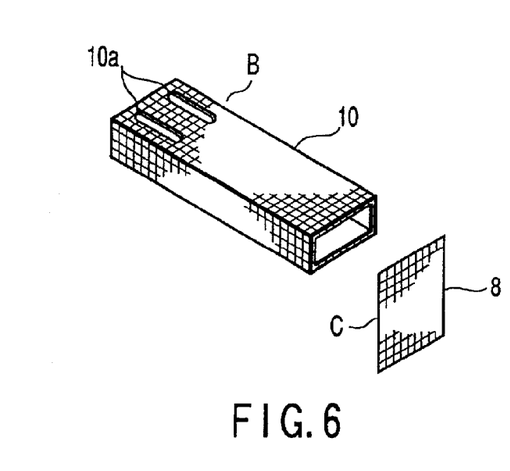
FIG. 6 is a perspective view showing analytic models obtained by meshing a to-be-coated object and an anode used for the electrodeposition coating.

The finite element method is used for this process. The PC 1 is operated to prepare meshed 10 analytic models (finite element models) of finite elements, including an analytic model A of the electrolytic cell 7, analytic model B of the side member portion 10, and analytic model C of the anode 8, according to data on the individual members and components, as shown in FIGS. 5 and 6. These analytic models A to C are based on the respective shapes of the electrolytic cell 7 that is filled with the actual electrodeposition coating fluid, anode 8, cathode 9, and side member portion 10 that conducts to the cathode 9, as shown in FIG. 4.

Then, the PC 1 is operated to supply current between the anode 8 and the cathode 9, as in the case of the actual electrodeposition coating, thereby simulating the time-based potential distribution in the electrolytic cell 7 that is the distribution obtained when the side member portion 10 is subjected to electrodeposition coating. Thereupon, the program advances to Step S3, a process for calculating the film thickness for each element Al.

The following is a description of the mechanism of electrodeposition. The following reaction advances to separate out a film on the cathode surface that is subjected to cation electrodeposit coating:

$2H_2O + 2e = H_2 + 2OH^-$, tm ... (3)

$RNH_3^+ + OH^- = RNH_2 + H_2O$. tm ... (4)

Here $RNH_3^+$ represents paint particles. If current is supplied to a cation-based paint in the manner based on equation (3), water is electrolyzed on the cathode surface to generate OH⁻ ions. When its concentration then attains a certain level, OH⁻ ions react with the paint particles dispersed in a solution and generates water as indicated by equation (4). The paint particles discharged by this reaction are extracted as a film on the electrode surface. Some of the generated OH⁻ ions disappear with time from a region near the electrode under the influence of diffusion and migration.

Figure 8:
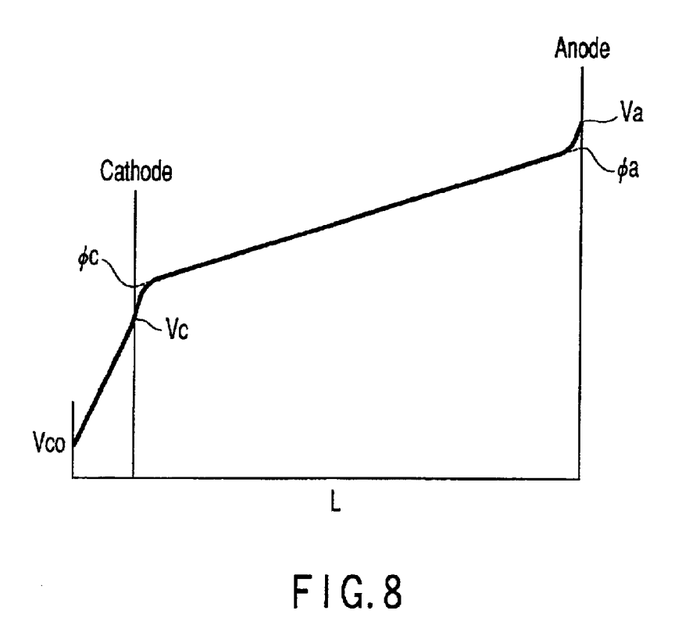
FIG. 8 is a diagram showing a one-dimensional model of the potential distribution between a cathode and the anode in the electrolytic cell.

In electrodeposition coating, a film of a substantially insulating material is separated out by current. This film acts as a resistance, and the current gradually decreases with the increase of the film thickness. The analysis of the electrodeposition coating is an unsteady problem that involves time-based change of current. If the time term is digitized by the differential method, a steady-state current field problem on a conductor can be reached. Accordingly, it is supposed that Laplace equation (5) having a potential ø as an unknown can be established for the regions of the paint, film, and electrode (cathode). FIG. 8 shows the one-dimensional distribution of the potential ø between the cathode and the anode. In FIG. 8, Vco is a potential on a boundary surface on which the film and the cathode are in contact with each other, and Vc is a potential on a boundary surface on which the film and the paint are in contact with each other.

A current density $\underline{i}$ can be obtained from equation (6) if the potential ø is settled. Here κ of equation (6) is conductivity. The Laplace equation can be subjected to a computerized numerical analysis by using a simulation technique such as the FEM (finite element method):

$$\nabla^2 \phi = 0, \text{ tm} \ldots (5)$$

$$i = -\kappa \nabla \phi. \text{ tm} \ldots (6)$$

In the electrodeposition coating, Faraday's Law can be established for the quantity of electricity and the generation of $OH^-$ ions. Since a film is formed as $OH^-$ ions and paint particles react with one another, however, the relation between the quantity of electricity and the film formation is not clear. For the analysis of the film thickness distribution for the electrodeposition coating, Laplace equation (5) that determines the current flow and a diffusion equation for $OH^-$ ions and paint particles must be achieved and solved. However, the analysis is not practical if this operation is carried out faithfully under the calculating capacity of the modern computer.

In order to make a practical film thickness distribution simulation for electrodeposition coating, therefore, the relation between the quantity of electricity and the weight of film deposit must be settled experimentally. Only if this relation can be settled, the electrodeposition coating film thickness distribution can be determined in the same manner as in the analysis of the deposit thickness distribution.

If the concentration of $OH^-$ ions attains a certain level, as mentioned before, $OH^-$ ions acts as a positive charge, and a film is separated out on the surface of the to-be-coated object or the side member portion 10. If its electrical resistance increases as the film is separated out in this manner, the paint particles are separated out in unfilmed (inside) regions (throwing power phenomenon).

The film thickness was calculated according to a well-known computational expression for deposit thickness.

More specifically, the computational expression for deposit thickness is given by $$h = \Sigma K_F IC.E. \Delta t/\rho. \text{ tm} \ldots (7)$$

Since the electrodeposition coating is different from plating in view of reaction, it is necessary only that the computational expression be changed with respect to those parts which are related to the reaction.

Thus, the electrodeposition coating involves the problem of the density of current (diffusively consumed current density) that is consumed for generating $OH^-$ ions diffusively getting away from the surface of the electrode irrespective of generating the film, so that "$Ic = I - I_d$" is used to define this current density. In consideration of whether or not $OH^-$ ions are more than an electric variable results in the concentration of $OH^-$ ions with which predetermined deposition of the electrodeposit paint is involved, moreover, an attempt was made to calculate the electrodeposition coating film thickness is by properly using two computational expressions (1) and (2) that include Ic.

More specifically, in the calculation of the electrodeposition coating film thickness, as in Step S4 of the flowchart of FIG. 3, the distribution of the currents that flow through the respective surfaces of the various parts of the finite element model of the side member portion 10 according to a potential in the electrolytic cell is obtained during simulating time-based change of potential in the electrolytic cell of the finite element model.

In Step S5, the electric variables of the currents that flow through the respective surfaces of the elements of the model are obtained and accumulated according to the distribution of the currents. In order to avoid the influence of consumed current due to the diffusion of $OH^-$ ions, as this is done, the electric variables are integrated when $I > I_d$ is given, and are not when $I \leq I_d$ is given.

Then, in Step S6, whether or not the cumulative electric variable is higher than the deposition starting electric variable $Q_0$ is determined.

If the cumulative electric variable Q is higher than the deposition starting electric variable $Q_0$ ($Q > Q_0$), the thickness $\underline{h}$ of the electrodeposition coating film is calculated according to $$h = \sum K_F (I - I_d) C.E. \Delta t/\rho \qquad (8)$$
$$= \sum K_F I_C C.E. \Delta t/\rho,$$

which is given in consideration of a current density that is obtained by subtracting the diffusively consumed current density $I_d$. If the cumulative electric variable Q is not higher than the deposition starting electric variable $Q_0$, the thickness $\underline{h}$ of the electrodeposition coating film is calculated according to $$h = \sum \alpha K_F (I - I_d) C.E. \Delta t/\rho \qquad (9)$$
$$= \sum \alpha K_F I_C C.E. \Delta t/\rho,$$

which is given also in consideration of the initial deposition coefficient a that prevents fluctuation of calculated values.

In Step S20, parameters C.E., Δt, ρ, $K_F$ that fulfill the computational expression for the film thickness are externally inputted by means of the keyboard 4, for example. More specifically, values that match an electrodeposition coating environment are inputted.

In order to secure high calculating accuracy, the electrodeposition coating equivalent $K_F$, diffusively consumed current density $I_d$, and deposition starting electric variable $Q_0$, among the aforesaid parameters, are settled in an experiment using a testing set, e.g., a constant-voltage coating test on flat plates.

Figure 9:
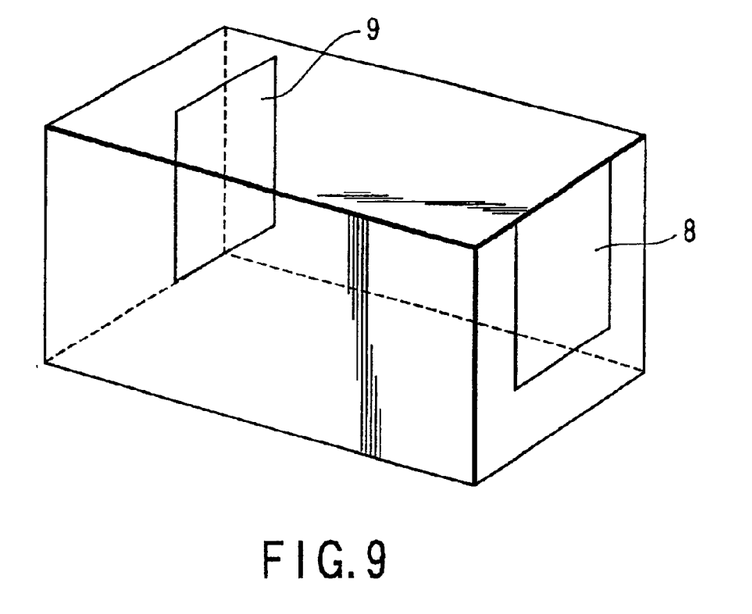
FIG. 9 is a diagram showing the construction of an experimental cell.
Figure 10:
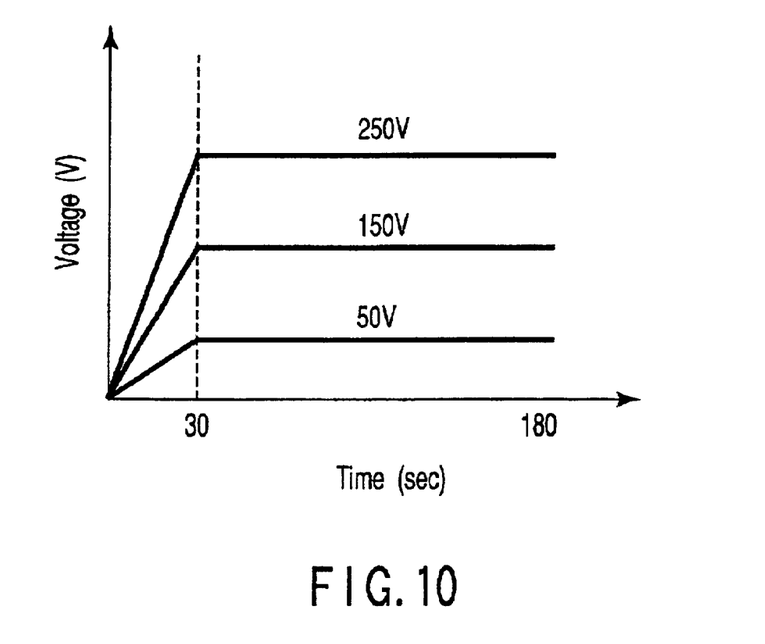
FIG. 10 is a time chart showing change of the coating voltage with time.

The constant-voltage coating test will be described first. In order to clear the relation between the quantity of electricity and the weight of film deposit, an experiment was conducted to subject flat plates to constant-voltage coating using an experimental cell, such as the one shown in FIG. 9. FIG. 10 shows a time chart for the coating voltages. The temperatures and stirring conditions are adjusted to the electrodeposition coating environment to which the analysis is applied. The current, quantity of electricity, and weight of deposit are measured for voltages of 50, 150, and 250 V and coating times of 60, 120, and 180 sec.

The 180 sec is the coating time of the side member portion 10 in the actual electrodeposition coating.

Figure 11:
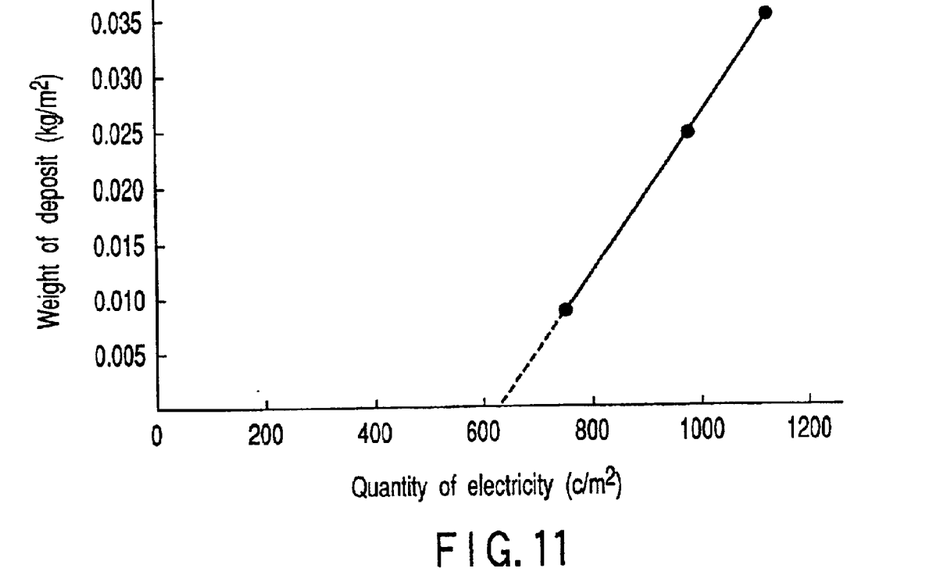
FIG. 11 is a diagram showing the relation between the quantity of electricity and the weight of deposit for the coating time of 180 sec.

The following is a description of the settlement of the electrodeposition coating equivalent $K_F$. TABLE 1 shows measurement data on the quantity of electricity and the weight of deposit in terms of values per unit area. The regression analysis is applied to the quantity of electricity and the weight of deposit for the coating voltages of 50, 150, and 250 V and the coating times of 60, 120, and 180 sec. The graph of FIG. 11 shows the result of application of the regression analysis. The graph indicates that the weight of film deposit is substantially proportional to the quantity of electricity. The coefficient of proportion for this case represents the weight of film deposit per 1 C, which will be referred to as electrodeposition coating equivalent $K_F$. The point of intersection of the X-axis and the regression line of the graph represents an electric variable that is not related to the film deposition for 180 sec of quantity of electricity. The electric variable that is not associated with the deposition will be referred to as the deposition invalid electric variable for the coating time of 180 sec.

current density was settled as a diffusively consumed current density $I_d$ of a computational expression for film thickness. The diffusively consumed electric variable for the coating time of 180 sec was obtained from this diffusively consumed current density $I_d$, and the difference between this value and the deposition invalid electric variable for the coating time of 180 sec was settled as the deposition starting electric variable $Q_0$ of a parameter of the computational expression for film thickness for this paint (TABLE 3). Although in order to settle each of parameter under the constant voltage experiment, the electrodeposition coating time at which a result of analysis want to be examined is settled.

TABLE 1

| Coating voltage (V) | Conduction time (sec) | Current density (A/m²) | Quantity of electricity (C/m²) | Weight of deposit (kg/m²) | Film deposition electric variable (C/m²) | Deposition invalid electric variable (C/m²) | Diffusively consumed current density (A/m²) | Deposition starting electric variable (C/m²) |
|---|---|---|---|---|---|---|---|---|
| 50 | 60 | 3.36 | 393 | 0.0050 | 71.6 | 321.3 | 2.55 | 171.1 |
|  | 120 | 2.79 | 579 | 0.0067 | 94.7 | 483.9 |  |  |
|  | 180 | 2.50 | 736 | 0.0076 | 107.8 | 627.9 |  |  |
| 150 | 60 | 5.29 | 521 | 0.0131 | 186.2 | 335.2 | 2.36 | 200.7 |
|  | 120 | 3.29 | 764 | 0.0186 | 265.4 | 498.9 |  |  |
|  | 180 | 2.71 | 936 | 0.0223 | 316.9 | 618.8 |  |  |
| 250 | 60 | 5.50 | 657 | 0.0216 | 307.7 | 349.5 | 2.33 | 216.7 |
|  | 120 | 3.71 | 929 | 0.0294 | 418.9 | 509.7 |  |  |
|  | 180 | 3.00 | 1100 | 0.0331 | 471.2 | 628.8 |  |  |

The following is a description of the settlement of the diffusively consumed current density $I_d$ and the deposition starting electric variable $Q_0$.

Figure 12:
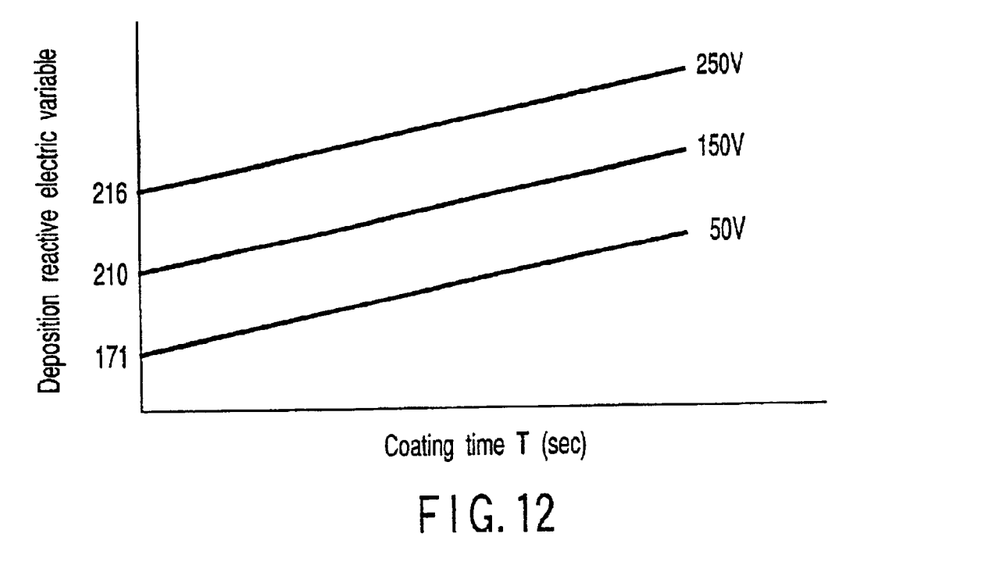
FIG. 12 is a diagram showing the relation between the coating time and the deposition invalid electric variable.

The film deposition electric variable of TABLE 2 was obtained by dividing the weight of deposit for each coating time by a previously settled electrodeposition coating equivalent $K_F$. The deposition reactive electric variable of TABLE 1 is a difference between the quantity of electricity and the film deposition electric variable for each coating time. Then, the regression analysis is applied to the deposition invalid electric variable and the coating time for each of the coating voltages shown in TABLE 1 (FIG. 12). The increase of the deposition invalid electric variable per unit time, a coefficient of proportion, will be referred to as the diffusively consumed current density. Further, a Y-section value for regression analysis will be referred to as the deposition starting electric variable. TABLE 1 shows the diffusively consumed current density and the deposition starting electric variable for each coating voltage obtained in this manner. The diffusively consumed current densities for the individual coating voltages are subject to some dispersion, which is within about ±5% of the average, 2.42, shown in TABLE 3. This average diffusively consumed Therefore, the difference between the film thickness by the analysis and the actual film thickness becomes small. In this case, after 180 sec is settled.

The following is a description of the settlement of the conductivity of films. TABLE 2 shows processes for obtaining the conductivity of the films. The currents in this table are currents for the individual voltages and individual conduction times. The film thickness was calculated from the weight of deposit of TABLE 1 with the film density of the film generated from the electrodeposit paint using in this experiment using 1,400 kg/m³. A film voltage, which is a voltage applied to the film, has a value that is obtained by subtracting a potential drop for the paint portion from the coating voltage. The potential drop of the paint portion was obtained as the product of the current value with the resistance of the paint portion adjusted to 53.6 Ω (sectional area: 100×160 mm, length: 150 mm, conductivity of the electrodeposit paint: 0.175 S/m). The respective conductivities of the films obtained in this manner were subject to a dispersion of about ±10% of the average of all the values at the maximum. This analysis used the average of all the values obtained as the conductivities K of the films.

TABLE 2

| Coating voltage (V) | Conduction time (sec) | Current (mA) | Film thickness (μm) | Film voltage (V) | Film resistance (kΩ·cm²) | Film resistivity (Ω·m) | Film conductivity (S/m) | Average film conductivity (S/m) |
|---|---|---|---|---|---|---|---|---|
| 50 | 60 | 47 | 3.6 | 47.5 | 141 | $3.94 \times 10^6$ | $2.54 \times 10^{-7}$ | $2.98 \times 10^{-7}$ |
|  | 120 | 39 | 4.8 | 47.9 | 172 | $3.62 \times 10^6$ | $2.76 \times 10^{-7}$ |  |
|  | 180 | 35 | 5.4 | 48.1 | 193 | $3.56 \times 10^6$ | $2.81 \times 10^{-7}$ |  |
| 150 | 60 | 74 | 9.3 | 146.0 | 276 | $2.96 \times 10^6$ | $3.38 \times 10^{-7}$ |  |
|  | 120 | 46 | 13.3 | 147.5 | 449 | $3.37 \times 10^6$ | $2.97 \times 10^{-7}$ |  |
|  | 180 | 38 | 15.9 | 148.0 | 545 | $3.43 \times 10^6$ | $2.92 \times 10^{-7}$ |  |
| 250 | 60 | 77 | 15.4 | 245.9 | 447 | $2.89 \times 10^6$ | $3.45 \times 10^{-7}$ |  |
|  | 120 | 52 | 21.0 | 247.2 | 666 | $3.17 \times 10^6$ | $3.16 \times 10^{-7}$ |  |
|  | 180 | 42 | 23.7 | 247.8 | 826 | $3.49 \times 10^6$ | $2.86 \times 10^{-7}$ |  |

In the analysis, as described above, the cell used in the experiment was modeled and meshed in tetrahedral elements. In consideration of the symmetry of the cell, it is necessary only that half of its whole region be modeled. The elements include metal (cathode), film, overvoltage, paint, and anode. The cathode is formed of solid elements such that it is as thick as a metal material. A film with zero thickness and overvoltage elements are located on the outside of the cathode. The analytic model has 5,710 nodes and 19,838 elements. TABLE 3 shows analytic parameters. Calculation was repeated 84 times at varied intervals of 0.5, 1, 2, 3, 5, 10 and 20 sec and for the coating time of 180 sec.

Figure 13:
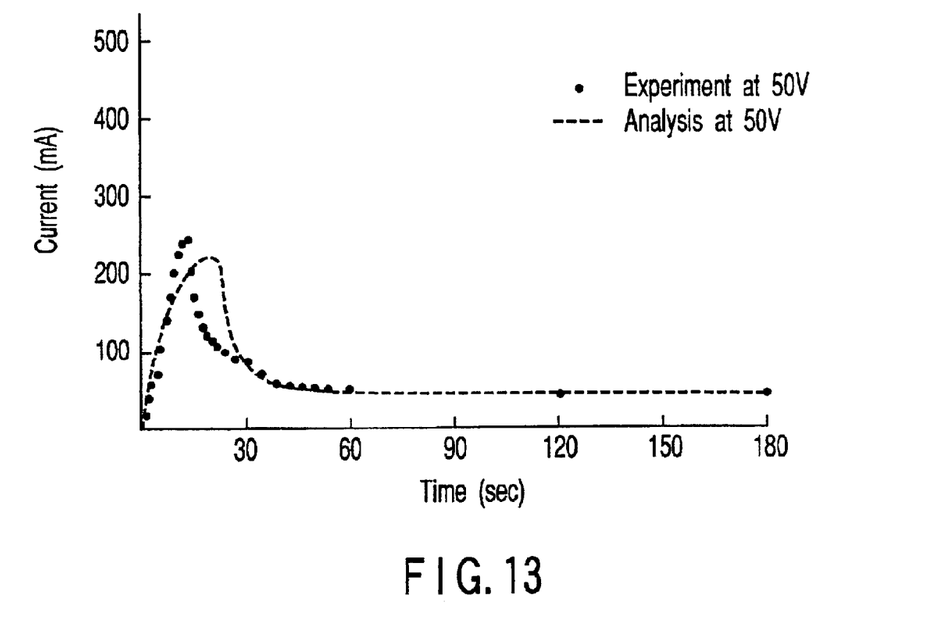
FIG. 13 is a diagram comparatively showing time-based changes of all currents at the coating voltage of 50 V.
Figure 14:
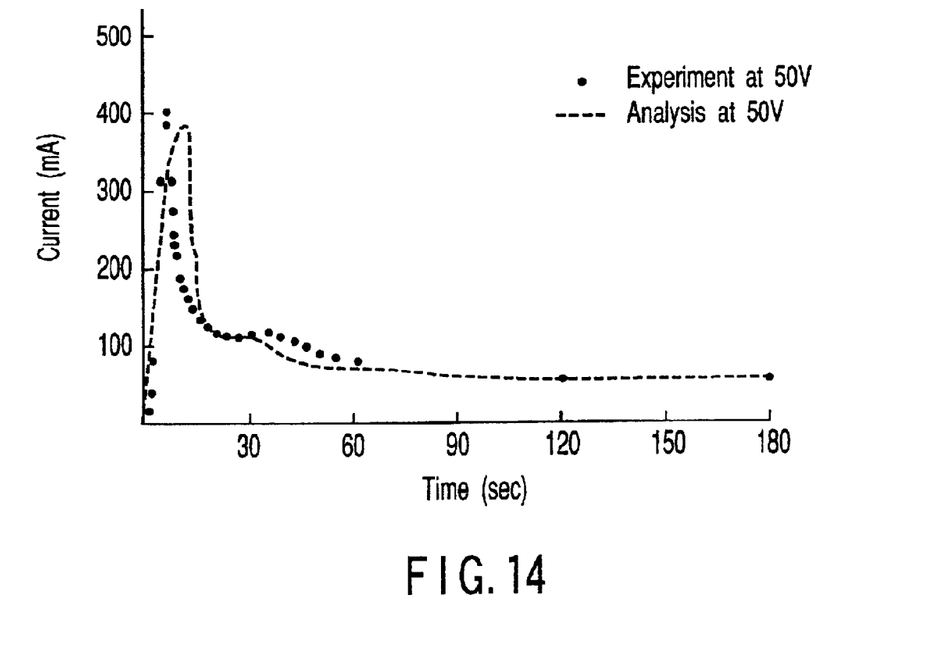
FIG. 14 is a diagram comparatively showing time-based changes of all currents at the coating voltage of 150 V.
Figure 15:
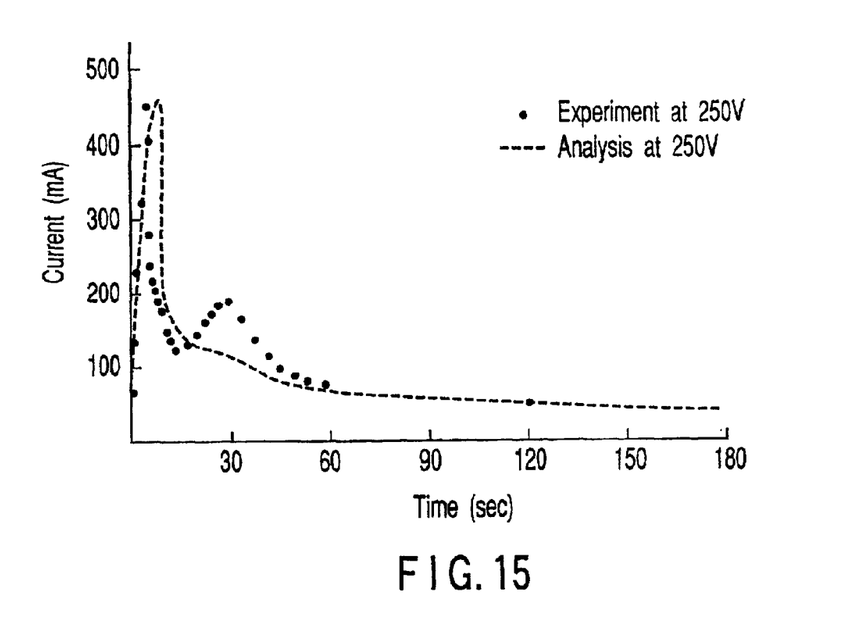
FIG. 15 is a diagram comparatively showing time-based changes of all currents at the coating voltage of 250 V.
Figure 16:
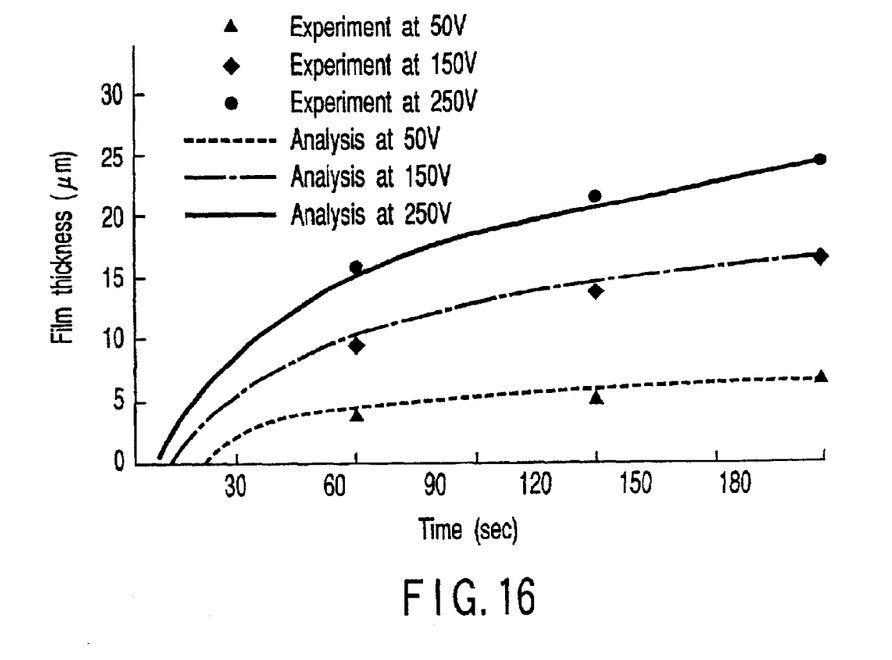
FIG. 16 is a diagram comparatively showing changes of film thickness at coating voltages of 50 V, 150 V, and 250 V with time.

FIGS. 13 to 15 are graphs showing comparative results of experiments and analyses on changes of all currents with time. FIG. 16 is a graph comparatively showing changes of film thickness with time. With all currents compared, initial peak current values for three voltages agree well with one another, and the times for the current peaks are substantially coincident, although the timing for the analyses is somewhat delayed. While there are considerable deviations after the passage of 30 sec for the voltage of 250 V, the current values for the three voltages finally agree well. Although the results of the experiments and the analyses for the film thickness distribution are subject to some differences after the passage of 60 sec, they agree well in 180 sec.

An FEM program was developed for calculating the electrodeposition coating film thickness in this manner. Practical film thickness calculating accuracy was able to be obtained in a manner such that an expression for film thickness calculation based on a deposition mechanism for electrodeposition coating was incorporated in the program on the assumption that a Laplace equation can be established having potentials in the regions for the cathode, film, overvoltage, and paint as unknowns. The expression for film thickness includes new parameters, a current value consumed due to the diffusion of $OH^-$ ions and an electric variable at which $OH^-$ ions' concentration reaches a constant concentration. The electrodeposition coating equivalent $K_F$, film deposition per 1 C, was settled as a constant by separating electric variables that are associated with film deposition from electric variables that are not.

The constant-voltage coating test on flat plates was analyzed, and experimental and analytic values were compared to confirm the high accuracy of film thickness analysis.

Although the initial deposition coefficient α has no substantial influence on the film thickness as the result of the analysis, it is set at a value such that overshooting of current in the process of calculation and the aforementioned fluctuation of the calculated values can be prevented effectively, and is inputted from the keyboard 4 shown in S20.

TABLE 3 shows specific figures for the parameters settled in this manner.

TABLE 3

| Item | Symbol | Unit | |
|---|---|---|---|
| Deposition invalid electric variable | $Q_i$ | $C/m^2$ | 625.2 |
| Electrodeposition coating equivalent | $K_F$ | kg/C | $7.03 \times 10^{-5}$ |
| Diffusively consumed current density | $I_d$ | $A/m^2$ | 2.42 |
| Diffusively consumed electric variable | $Q_d$ | $C/m^2$ | 435.6 |

TABLE 3-continued

| Item | Symbol | Unit | |
|---|---|---|---|
| Deposition starting electric variable | $Q_0$ | $C/m^2$ | 189.6 |
| Coating time | T | sec | 180 |

Figure 7:
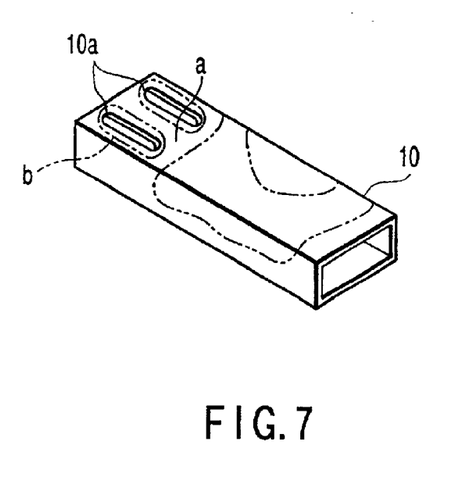
FIG. 7 is a perspective view showing an electrodeposition coating film thickness distribution displayed on the analytic model by film thickness calculation.

The film thickness for each element of the analytic model of the side member portion 10 is calculated with the passage of the coating time as the processes for film thickness calculation using the settled parameters advances. Before the termination of the coating time, the results of the film thickness calculation (Step S10) for these individual parts are delivered to the screen of the display unit 5 (Step S11) with a film thickness distribution such that a difference in thickness is indicated by a difference in color, as shown in FIG. 7.

It is necessary only that the film thickness of each part of the side member portion 10 be checked for adequacy with reference to the display. A comparison was made between maximum and minimum film thicknesses, more specifically, film thicknesses analytically obtained at two points (point a on the outer surface and point b on the inner surface) of the side member portion 10, and film thicknesses experimentally obtained at the two points of the side member portion 10 by actual electrodeposition coating. Thereupon, it was confirmed that those film thicknesses resembled with high accuracy.

Thus, the thicknesses of films electrodeposited on various parts of the to-be-coated object can be calculated with high accuracy by only executing data processing of the analytic model that replaces the to-be-coated object without using the actual to-be-coated object that is complicated and expensive. If the throwing power is insufficient, the formation of films with satisfactory thicknesses can be confirmed by only modifying data on the analytic model to change the current flow and the respective shapes of the individual parts. Thus, the film thickness can be easily controlled at low cost. Since the electric variables of the currents that flow through the surfaces of the to-be-coated object are accumulated only when the diffusively consumed current density is exceeded, in particular, the film thickness can be calculated with high accuracy.

Further, a program for carrying out the electrodeposition coating film thickness calculating method described in connection with the foregoing embodiment may be stored in a flexible disc. In this case, the program is set in an FDD 6 so that it can be downloaded.

It is to be understood that the present invention is not limited to the embodiment described above, and that various changes and modifications may be effected therein by one skilled in the art without departing from the scope or spirit of the invention. In the foregoing embodiment, for example, a side frame in the shape of a flat tube is used as the to-be-coated object. Naturally, however, the invention may be effectively applied to the case of electrodeposition coating of members of any other shapes. Further, the methods for settling and inputting the parameters are not limited to the embodiment described herein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrodeposition coating film thickness calculating method comprising:

originating data on a finite element model having a shape corresponding to an electrolytic cell filled with an electrodeposition coating fluid, an anode and a cathode located in the fluid in the electrolytic cell, and a to-be-coated object immersed in the fluid so as to conduct to the cathode;

supplying current between the anode and the cathode, thereby simulating a time-based potential distribution in the electrolytic cell in case of electrodeposition coating;

calculating the distribution of current then flowing through the surface of each part of the finite element model of the to-be-coated object;

obtaining and accumulating the electric variables of currents flowing through the respective surfaces of the elements of the to-be-coated object;

determining whether or not the cumulative electric variable is higher than a deposition starting electric variable;

calculating a thickness $\underline{h}$ of a film electrodeposited on the surface of the to-be-coated object according to $h=\Sigma K_F I_C C \cdot E \cdot \Delta t/\rho$ ($K_F$ is an electrodeposition coating equivalent, $I_C$ is a film deposition current density, C. E. is a current efficiency, $\Delta t$ is a time interval, and $\rho$ is a film density) if the cumulative electric variable is higher than the deposition starting electric variable; and calculating the thickness $\underline{h}$ of the film electrodeposited on the surface of the to-be-coated object according to $h=\Sigma \alpha K_F I_C C \cdot E \cdot \Delta t/\rho$ ($\alpha$ is an initial deposition coefficient) if the cumulative electric variable is not higher than the deposition starting electric variable.

2. An electrodeposition coating film thickness calculating method according to claim 1, wherein said electrodeposition coating equivalent $K_F$ is obtained as the weight of film deposit per 1 C by subjecting a flat plate to constant-voltage coating at different voltages for different coating times, measuring the quantity of electricity and the weight of film deposit separated out on the flat plate of the cathode, and regressively analyzing the relation between the quantity of electricity and the weight of deposit.

3. An electrodeposition coating film thickness calculating method according to claim 2, wherein said deposition starting electric variable is calculated as an electric variable at the point of intersection with the Y-axis for regression analysis by dividing the weight of deposit for each coating time by the electrodeposition coating equivalent $K_F$, thereby calculating a film deposition electric variable, obtaining the difference between the quantity of electricity and the film deposition electric variable for each coating time, thereby calculating a deposition invalid electric variable, and applying regression analysis to the deposition invalid electric variable and the coating time for each coating voltage, thereby calculating an increase of the deposition invalid electric variable per unit time as a diffusively consumed electric variable.

4. An electrodeposition coating film thickness calculating method according to claim 2, wherein said deposition starting electric variable is obtained by dividing the weight of deposit for each coating time by the electrodeposition coating equivalent $K_F$, thereby calculating a film deposition electric variable, obtaining the difference between the quantity of electricity and the film deposition electric variable for each coating time, thereby calculating a deposition invalid electric variable, applying regression analysis to the deposition invalid electric variable and the coating time for each coating voltage, thereby calculating ah increase of the deposition invalid electric variable per unit time as a diffusively consumed electric variable, calculating an average of diffusively consumed current densities for individual coating voltages, calculating the diffusively consumed electric variable for the coating time of 180 sec from the average diffusively consumed current density, and subtracting the diffusively consumed electric variable for the coating time of 180 sec from the deposition invalid electric variable for the coating time of 180 sec.

5. An electrodeposition coating film thickness calculating method according to claim 1, wherein said deposition starting electric variable is an electric variable obtained when a fixed concentration is attained by $OH^-$ ions generated on the electrode surface of the cathode.

6. An electrodeposition coating film thickness calculating method according to claim 1, wherein said deposition starting electric variable is an electric variable obtained when a fixed concentration is attained by $H^+$ generated on the electrode surface of the anode.

7. An electrodeposition coating film thickness calculating method according to claim 1, wherein said electric variables of the currents flowing through respective surfaces of the finite elements of the to-be-coated object are accumulated only when a diffusively consumed current density corresponding to diffusively consumed current is exceeded.

* * * * *